(12) United States Patent
Martikainen et al.

(10) Patent No.: US 11,051,527 B2
(45) Date of Patent: Jul. 6, 2021

(54) CHEESE AND METHOD FOR ITS MANUFACTURING

(71) Applicant: VALIO LTD, Helsinki (FI)

(72) Inventors: Emmi Martikainen, Espoo (FI); Gerrit Smit, Wierden (NL)

(73) Assignee: VALIO LTD., Helsinki (FI)

( * ) Notice: Subject to any disclaimer, the term of this patent is extended or adjusted under 35 U.S.C. 154(b) by 0 days.

(21) Appl. No.: 14/897,507

(22) PCT Filed: Jun. 9, 2014

(86) PCT No.: PCT/FI2014/050466
§ 371 (c)(1),
(2) Date: Dec. 10, 2015

(87) PCT Pub. No.: WO2014/199014
PCT Pub. Date: Dec. 18, 2014

(65) Prior Publication Data
US 2016/0120198 A1    May 5, 2016

(30) Foreign Application Priority Data

Jun. 10, 2013 (FI) .................................. 20135634

(51) Int. Cl.
*A23C 19/076* (2006.01)
*A23C 19/064* (2006.01)
*A23C 19/09* (2006.01)

(52) U.S. Cl.
CPC ........ *A23C 19/064* (2013.01); *A23C 19/0921* (2013.01)

(58) Field of Classification Search
CPC ........ A23V 2002/00; A23V 2250/5424; A23V 2250/156; A23V 2250/54252; A23V 2250/1644; A23L 33/19; A23C 19/0684; A23C 19/084; A23C 19/02; A23C 19/00; A23C 19/064; A23C 19/0921; A23C 19/08; A23C 9/1422; A23C 9/1425
See application file for complete search history.

(56) References Cited

U.S. PATENT DOCUMENTS

| | | | |
|---|---|---|---|
| 4,515,815 A * | 5/1985 | Kosikowski ....... | A23C 19/0285 426/40 |
| 4,963,387 A | 10/1990 | Nakagawa et al. | |
| 2005/0249854 A1* | 11/2005 | Merrill ................. | A23C 19/093 426/582 |
| 2012/0183644 A1 | 7/2012 | Martikainen et al. | |

FOREIGN PATENT DOCUMENTS

| | | |
|---|---|---|
| DE | 103 17 030 | 10/2003 |
| EP | 1 061 811 | 8/2004 |
| EP | 1 550 374 | 7/2005 |
| GB | 2 015 863 | 9/1979 |
| JP | 8-266221 | 10/1996 |
| JP | 2002-223697 | 8/2002 |
| RU | 2 291 623 | 1/2007 |
| SU | 1364268 | 1/1988 |
| WO | WO 90/15541 | 12/1990 |
| WO | WO 99/40798 | 8/1999 |
| WO | WO 2004/049828 | 6/2004 |
| WO | WO 2011/039414 | 4/2011 |
| WO | WO 2013/116621 | 8/2013 |

OTHER PUBLICATIONS

Martens et al. vol. 29, No. 3, May 1, 1976, machine translation, english pp. 684-685, (Year: 1976).*
Martens et al. Processing, Composition, and Properties of Gouda Cheese, having a Reduced Content of Sodium. Landbouwtijdschrift, vol. 29, No. 3, May 1, 1976, English Translation (Year: 1976).*
https://nutritiondata.self.com/facts/dairy-and-egg-products/35/2 Way Back Machine, https://web.archive.org/web/20100716114819/https://nutritiondata.self.com/facts/dairy-and-egg-products/35/2 Jul. 16, 2010 (Year: 2010).*
USDA Specifications for Ricotta Cheeses. Jan. 15, 1981 (Year: 1981).*
Europecode 2, Codex extract, CheeseType extracted from Codex General Standard for Cheese, vol. 12; Milk and milk produts, Codex General Standard for Cheese (Codex STAN A-Jun. 1978), posted Jan. 20, 2000, pp. 1-2. http://www.ianunwin.demon.co.uk/eurocode/foodinfo/codex/cdx-cheesetype.htm (Year: 2000).*
http://en.wikipedia.org/wiki/Ricotta, retrieved online Sep. 24, 2020, pp. 1-2. (Year: 2020).*
International Search Report for PCT/FI2014/050466, dated Nov. 4, 2014, 3 pages.
Written Opinion of the International Searching Authority issued in PCT/FI2014/050466 dated Nov. 4, 2014, 5 pages.
Search Report for FI 20135634 dated Feb. 11, 2014, 2 pages.
Wyke Farms, "Super Light Somerset Mature Cheese", Database GBPD, Jan. 2012, 2 pages.
Wegmans, "Port Wine Spreadable Cheese with Almonds", Database GNPD, Jan. 2013, 2 pages.
Pöltsamaa Meierei, "Cheese Slices", Database GNPD, Dec. 2012, 2 pages.
Friendship Dairies, "Single Serve 1% Low Fat Cottage Cheese", Database GNPD, Dec. 2012, 4 pages.
Vermont Creamery, "Double-Cream Aged Goat & Cow Milk Cremont Cheese", Database GNPD, Jan. 2012, 4 pages.
Russian Office Action issued in Appln. No. 2015156314/10(086780) dated Feb. 21, 2018 (w / translation).
European Office Action issued in Appln. No. 14 739 502.4 dated May 24, 2018.

(Continued)

*Primary Examiner* — Hong T Yoo
(74) *Attorney, Agent, or Firm* — Nixon & Vanderhye P.C.

(57) ABSTRACT

The invention relates to a method for making cheese wherein cheese is salted with a salting agent comprising milk minerals and NaCl or a mixture thereof. The invention also relates to ripened cheese having a ratio of K/Na of 0.39 to 4.0 and a K content of more than 0.08%.

26 Claims, No Drawings

(56) References Cited

OTHER PUBLICATIONS

Martens et al., "Bereiding, samenstelling en eigenschappen van Goudse kaas met verlaagd natriumgehalte [Production, composition and properties of low-sodium Gouda cheese]" *Landbouwtijdschrift [Revue de L'agriculture] Ministerie Van Landbouw, Dienst Informatie*, vol. 29, No. 3 May 1, 1976, pp. 681-698 (w/ English summary).
Katsiari et al., "Reduction of Sodium Content in Feta Cheese by Partial Substitution of NaCl by KCl" *Int. Dairy Journal*, vol. 7: 465-472 (1997).
Office Action issued in JP Appln. No. 2016-517647 dated Dec. 11, 2018 (w/ partial translation).
Office Action issued in RU Appln. No. 2015156314 dated Jan. 25, 2019 (with translation).

\* cited by examiner

CHEESE AND METHOD FOR ITS MANUFACTURING

This application is the U.S. national phase of International Application No. PCT/FI2014/050466 filed 9 Jun. 2014 which designated the U.S. and claims priority to FI Patent Application No. 20135634 filed 10 Jun. 2013, the entire contents of each of which are hereby incorporated by reference.

FIELD OF THE INVENTION

The present invention relates to cheese making by using milk minerals and NaCl for salting of cheese.

BACKGROUND OF THE INVENTION

There is a great global interest in healthy food and in reduction of healthy risks caused by unfavourable food composition often provided with too high salt and/or fat content. Especially, detrimental effects on cardiovascular diseases of a high salt content in food are recognized and a reduced dietary sodium intake is pursued.

There is a wide variety of cheese types available in the market and consumed daily among a number of people. Cheeses with rich taste and pleasant appearance are typically associated with relative high amount of fat and salt in cheese. Accordingly, demand for salt reduction of table salt, i.e. NaCl, also in cheese products has been topical for many years in order to provide cheese products with more favourable nutritional composition to consumers.

In terms of table salt, there are already low-salt (NaCl<0.3%) and salt-free fresh cheeses (cream cheeses) on the European market. Methods are known for replacing salt with magnesium salts (see e.g. WO 90/15541), for instance, which often causes a taste defect of bitterness and acidity. When table salt is reduced and the sodium content decreases, disadvantageous effects of other minerals on organoleptic properties, particularly taste, of the product become stronger. WO 2004/049828 describes a process for the manufacture of a salt whey product having a NaCl content of at least 30%. The obtained salt may be used for cheesemaking. Cheddar cheese and processed cheese having approximately 2% NaCl are described in the document.

Salt has many different purposes in cheese. For example, salt reduces water activity and helps controlling microbial growth in cheese. Salt has thus a beneficial influence on cheese preservability. Salt has also an influence on cheese texture and composition. In particular, salt imparts taste and flavour to cheese. Reduction of a salt content in cheeses has not been successful without an adverse effect on at least some organoleptic properties of cheeses. Low-salt cheeses tend to taste weak or be tasteless and have a sticky and soft texture. Low-fat cheeses, in turn, tend to taste weak and bitter and have a gummy texture. Typical descriptions of defects in smell and taste of cheeses include: acrid, salty, salt-free, low-salt, tasteless, flavourless, mild and unclean. Defects in appearance and texture of cheeses include: sticky, chewy and gummy.

There are various salting processes commonly used in cheese making to introduce salt to cheese including, for example, brine salting, dry salting, surface salting and pre-salting. Each salting process is typical for specific cheese type. The most popular industrial salting processes are dry salting and brine salting. In dry salting, dry salt crystals are added to broken or milled curd pieces. In brine salting, moulded cheese blocks are immersed into a brine solution for a specific time period. Salt uptake varies depending on the salting process. Further, it is known that there are a number of factors that influence on salt uptake, including concentration of a brine solution, temperature and pH during the salting process, fat content of cheese, moisture on a fat-free basis (MFFB) of cheese, size of a cheese block, etc.

There is need to provide cheeses and cheese-like products with a flawless taste, appearance and texture and which advance eating habits, health and well-being and, particularly, contain a reduced amount of sodium. It is very challenging to achieve cheese products with an absolutely flawless taste, appearance and texture and which are similar to cheeses with conventional NaCl contents.

BRIEF DESCRIPTION OF THE INVENTION

In an aspect, the present invention provides a method for making cheese having a ratio of K/Na of more than 0.2 to 4.0 wherein cheese is salted with a salting agent comprising milk minerals and NaCl.

It was surprisingly found that a more favourable mineral composition can be provided to cheese by replacing a portion of sodium by potassium and other minerals such as calcium, phosphorus and magnesium by means of milk minerals and thus increasing a ratio of K/Na of cheese without deteriorating the organoleptic properties, especially taste, thereof. Especially, by using milk minerals in salting step(s) of cheese a ratio of K/Na of cheese can be adjusted to a level which is more favourable to health. The European Food Safety Authority (EFSA) has recognized that food having K>0.3% has favourable effect on health in that maintenance of normal blood pressure and maintenance of normal muscular and neurological functions are achieved.

The invention provides an economical, efficient and simple process for production of cheese having a health promoting mineral composition and good organoleptic properties.

In another aspect, the invention provides ripened cheese having a ratio of K/Na of 0.39 to 4.0 and a K content of more than 0.08%.

In still another aspect, the invention provides cheese having a ratio of K/Na of more than 0.2 to 4.0, which is salted with a salting agent comprising milk minerals and NaCl.

DETAILED DESCRIPTION OF THE INVENTION

As used herein, the term "milk minerals" is meant to include minerals derived from milk and/or whey.

In an aspect, the present invention provides a method for making cheese having a ratio of K/Na of more than 0.2 to 4.0 wherein cheese is salted with a salting agent comprising milk minerals and NaCl. In an embodiment, milk minerals and NaCl are each provided as a separate salting agent. In another embodiment, milk minerals and NaCl are provided as a mixture.

The composition of milk minerals used in the invention is typically as follows (% of dry matter):
lactose 2.4 to 50%
sodium 3.5 to 12%
potassium 0.5 to 35%
magnesium 0.1 to 1.5%
calcium 0.1 to 25%
protein 8 to 20%.

Milk minerals can be obtained from milk and whey by different separation techniques including but not limited to chromatographic separation and membrane filtration techniques, e.g. ultrafiltration (UF retentate, UF concentrate, UF permeate), microfiltration (MF retentate, MF permeate), nanofiltration (NF permeate; NF retentate), or reverse osmosis (RO retentate, RO concentrate). Various techniques can be combined in an appropriate manner. The obtained fractions, retentates and/or concentrates can be further concentrated, evaporated and/or dried by using techniques known and accepted in the art. Milk minerals for use in the invention can thus be provided as a concentrate up to powder. In an embodiment, milk minerals are used as concentrate having a dry matter content of about 9% to about 40%.

In an embodiment, milk minerals are provided as a milk mineral concentrate produced by using membrane filtration techniques in which milk is first subjected to ultrafiltration, the resultant ultrafiltration permeate is subjected to nanofiltration and the resultant nanofiltration permeate is further subjected to reverse osmosis (RO) to concentrate milk minerals into a RO retentate.

In another embodiment, milk minerals are obtained from whey by a process where whey is nanofiltered and the obtained nanofitration permeate is further subjected to reverse osmosis to concentrate milk minerals into a RO retentate.

If desired, the RO retentates can be further concentrated by evaporation up to powder and used in accordance with the invention in various salting processes of cheese. In an embodiment of the invention, milk minerals are used as a RO concentrate having a dry matter content from about 9% to about 40%, specifically about 16%.

Milk minerals may also be, for example, a whey salt described in publication EP 1061811 B1, i.e. a milk mineral powder known as trademark Valio Milk Mineral Powder VMMP (Valio Oy). Other feasible milk-based mineral products include such trademarks as Capolac® MM-0525 BG (Arla Foods Ingredients), Vitalarmor Ca (Armor Proteines) and Sodidiet 40 MI (Sodiaal Industrie).

Various milk mineral products can be used as a sole milk mineral salting agent or combined together in any combination.

NaCl can be used in a form varying from liquid to powder. In an embodiment, NaCl is used as a brine solution from about 16% up to saturated. In another embodiment, NaCl brine of about 16% to about 30% is used. In a further embodiment, NaCl brine of about 18% is used.

Milk minerals and NaCl can be used each as a separate salting agent or they can be combined together into a single salting agent which is used for salting of cheese in one or more salting step.

In the present invention, any salting process generally known in cheese making can be used including but not limited to brine salting, injection salting, dry salting, surface salting, salting of grains and pre-salting. Salting of cheese is carried out with a process commonly used for each cheese type. Cheese can be salted in one or more salting steps where various salting processes are appropriately used. A suitable salting agent and a concentration thereof are appropriately chosen for each salting process.

In an embodiment, cheese is subjected to salting of grains.

In another embodiment, cheese is subjected to brine salting. Cheese can be brine-salted with milk minerals and NaCl separately and/or a combination thereof in any order in one or more steps. In an embodiment, cheese is first brine-salted with milk minerals followed by brine salting with NaCl. In another embodiment, cheese is first brine-salted with NaCl followed by brine salting with milk minerals. In a further embodiment, cheese is first brine-salted with milk minerals, then with NaCl and further with milk minerals. In still a further embodiment, cheese is first brine-salted with NaCl, then brine-salted with milk minerals and further followed by brine salting with NaCl.

In an embodiment, a milk mineral brine solution having a dry matter content of about 16% and a 18% NaCl brine solution are used in brine salting.

In an embodiment, cheese is subjected to brine salting and surface salting. In an embodiment, brine salting is carried out with NaCl and surface salting with milk minerals. In brine salting, 18% NaCl brine is used. In surface salting, a milk mineral brine with a dry matter content of about 16% is used. The amount of the milk mineral brine for surface salting can vary from about 0.5% to about 5%. In an embodiment, about 1% to about 2%, by weight of cheese, of the milk mineral brine is added on top of cheese before packaging. In a further embodiment, the amount of the milk mineral brine in surface salting is about 2%.

The time period for carrying out brine salting with milk minerals and NaCl can vary in the range from about 0.5 hour to about 96 hours. A suitable time to achieve a K/Na ratio of more than 0.2 to 4.0 of cheese in brine salting depends, i.a., on a water and fat content of cheese, and a size of cheese blocks. Generally, the lower the water content of cheese and the bigger the size of cheese block is, the longer the time period for brine salting is needed. In an embodiment, brine salting with milk mineral brine is carried out for about 1 hour to 4 hours and brine salting with NaCl brine is typically carried out for about 4 to about 8 hours. In an embodiment, cheese is subjected to a first brine salting with milk minerals for about 4 hours and to a second brine salting with NaCl for 8 hours. The first and the second brine salting can be performed in any order. In another embodiment, cheese is first subjected to brine salting with milk minerals for one hour, then to brine salting with NaCl for 4 hours and further to brine salting with milk minerals for another one hour.

The method of the invention can be applied to any type of cheese with different fat contents. Cheeses are prepared in any manner suitable for each cheese type. Cheese making processes typically include coagulating or curdling/rennet-ing of milk, cutting the coagulum into pieces, stirring and possible heating of the cheese curd mixture, whey removal, pressing the curd into a desired shape, salting and cellaring (storage), i.e. ripening, of the pressed cheeses. Various cheeses are prepared under the conditions generally used and with conventional starters and coagulants for each cheese type. Milk obtained from an animal, such as a cow, sheep, goat, camel, mare or any other animal that produces milk suitable for human consumption can be used as a raw material for cheese making. Milk is typically standardized in respect of fat content and pasteurized before cheese making. Cheese making conditions, raw materials and ingredients used in each type of cheese making are generally known in the field.

The method of the invention can be used for making, for example, semi-soft, semi-hard, hard and extra-hard ripened and unripened cheeses. The method of the invention can also be used for making fresh cheeses. Further, the cheese prepared by the process of the invention can also be used as a raw material in the preparation of processed cheeses.

The expressions soft, semi-soft, semi-hard (solid), hard and extra hard are strictly defined in FAO/WHO A-6-1968

Codex General Standard for Cheese using their composition on the basis of the water content of the fat-free portion (MFFB %). Thus, soft cheese in the present application refers to cheese whose water content of the fat-free part is more than 67%, semi-soft cheese in the present application refers to cheese whose water content of the fat-free part is 61 to 69%, semi-hard cheese in the present application refers to cheese whose water content of the fat-free part is 54 to 63%, hard cheese in the present application refers to cheese whose water content of the fat-free part is 49 to 56%, and extra hard cheese in the present application refers to cheese whose water content of the fat-free part is less than 51%.

In addition to the aforementioned cheeses, the term "cheese" also refers hereinafter in the present application to cheese-like products. In a cheese-like product, milk fat and/or protein is replaced by another suitable fat or protein, or both, partly or completely. Another suitable protein is derived from plants, such as soybean. Typically, milk fat is partly replaced by edible fat, typically of plant origin, such as rapeseed oil, fractionated palm oil or coconut oil. Also, lard can be used.

The method of invention provides cheeses having a ratio of K/Na of more than 0.2 to 4.0. In an embodiment, the ratio of K/Na is more than 0.8. In another embodiment, the K/Na ratio is 0.39 to 0.8. In a further embodiment, the K/Na ratio is 0.8 to 1.2. In a still further embodiment, the K/Na ratio is 0.52 to 3.2.

NaCl content of the cheese prepared by the method of the invention is more than 0.81% to 5.0%. In an embodiment, the NaCl content is more than 0.81% to 1.3%. In another embodiment, the NaCl content is 1.3%.

K content of the cheese prepared by the method of the invention is more than 0.08%. In an embodiment, the K content is more than 0.2%. In still a further embodiment, the K content is more than 0.3%.

The fat content of cheese of prepared by the method of the invention can vary from about 0.2% to about 45%. In an embodiment, the fat content of cheese is about 9% to about 29%. In another embodiment, the fat content is about 24%. In an embodiment, the fat content of cheese is about 0.2% to about 20%.

In an embodiment, cheese prepared by the method of the invention is ripened cheese. In the present application, ripened cheese refers to cheese defined in FAO/WHO Codex General Standard for Cheese A-6-1968. Examples of hard and ripened cheeses include Valio Oltermanni®, Valio Turunmaa®, Valio Finlandia®, Valio Polar®, Jarlsberg®, Grana, Edam, Emmental, Gouda, and Havarti.

In another embodiment, cheese prepared by the method of the invention is fresh cheese, such as Cottage cheese and Mozzarella. Cottage cheese is typically made with acidulant coagulation without a rennet or with a small amount of a rennet. Cheese is typically acidic (pH 4.4-4.9). In the preparation, milk raw material is preheated in a conventional manner and then coagulated with an acidulant. After coagulation, the coagulum is cutted to form a whey-curd mixture. The mixture is typically scalded at a temperature of 45 to 55° C. under stirring for 60 to 120 minutes. Whey is separated from the curd mixture. The curd is cooled, washed, standardized (fat, salt) with a dressing, and packed.

Mozzarella is Pasta Hata type, semi-soft, "elastic" fresh cheese. In Mozzarella manufacturing process, a cheese curd is made with a rennet and a Mozzarella starter. Whey is separated from the cheese curd, the curd is pressed, salted and, if necessary, cheddared until a suitable pH, typically about 5.2-5.6, is achieved. Cheese is then milled to small pieces, heated and kneaded in whey at about 70° C. to a smooth plastic mass. The mass is moulded and cooled to provide Mozzarella. Mozzarella has a pH of 4.7-5.6.

In another aspect, the invention provides ripened cheese having a ratio of K/Na of 0.39 to 4.0 and a K content of more than 0.08%. In an embodiment, the ratio of K/Na is more than 0.8. In a further embodiment, the K/Na ratio is 0.8 to 1.2.

NaCl content of the ripened cheese of the invention is more than 0.81% to 5.0%. In an embodiment, the NaCl content is more than 0.81% to 1.3%. In another embodiment, the NaCl content is 1.3%.

In an embodiment, the K content of the ripened cheese is more than 0.2%. In still a further embodiment, the K content is more than 0.3%.

The fat content of the ripened cheese of the invention can vary from about 5% to about 45%. In an embodiment, the fat content of cheese is about 9% to about 29%. In another embodiment, the fat content is about 24%.

In still another aspect, the invention provides cheese having a ratio of K/Na of more than 0.2 to 4.0, which is salted with a salting agent comprising milk minerals and NaCl.

The invention will be described in more detail by means of the following examples. These examples are only given to illustrate the invention and should not be considered to limit the scope of the invention in any way.

A RO retentate prepared from milk as described above by ultrafiltration, nanofiltration and reverse osmosis is used as a milk mineral salt in the Examples.

EXAMPLES

Example 1

Edam type cheese having a fat content of 24% was prepared in a conventional manner from standardized milk by using typical starters and coagulants for Edam cheese. Salting of the pressed and moulded cheese block in a vat was carried out as follows: Cheese block was first immersed into a RO retentate (16%) for 4 hours. Subsequently, the cheese block was subjected to brine salting with NaCl (18%) for 8 hours.

K content of the salted cheese was 0.17% based on weight of cheese. Na content of the salted cheese was 0.38% based on weight of cheese. Thus, total amount of Na+K was 0.55% and K/Na ratio was 0.45.

Example 2

Edam type cheese having a fat content of 24% was prepared in a conventional manner from standardized milk by using typical starters and coagulants for Edam cheese. Salting of the pressed and moulded cheese block in a vat was carried out as follows: Cheese block was first immersed into a RO retentate (16%) for 3 hours. Subsequently, the cheese block was subjected to brine salting with NaCl (18%) for 8 hours.

K content of the salted cheese was 0.14% based on weight of cheese. Na content of the salted cheese was 0.36% based on weight of cheese. Thus, total amount of Na+K was 0.50% and K/Na ratio was 0.39.

Example 3

Edam type cheese having a fat content of 24% was prepared in a conventional manner from standardized milk by using typical starters and coagulants for Edam cheese. Salting of the pressed and moulded cheese block in a vat was carried out as follows: Cheese block was first immersed into a brine solution (18% NaCl) for 8 hours, followed by salting in a RO retentate (16%) for 4 hours.

K content of the salted cheese was 0.34% based on weight of cheese. Na content of the salted cheese was 0.28% based on weight of cheese. Thus, total amount of Na+K was 0.62% and K/Na ratio was 1.2.

Example 4

Havarti type cheese having a fat content of 29% was prepared in a conventional manner from standardized milk by using typical starters and coagulants for havarti cheese. Salting of the pressed and moulded cheese block in a vat was carried out as follows: Cheese block was first immersed into a brine solution (18% NaCl) for 8 hours, followed by salting in a RO retentate (16%) for 2 hours.

K content of the salted cheese was 0.24% based on weight of cheese. Na content of the salted cheese was 0.31% based on weight of cheese. Thus, total amount of Na+K was 0.55% and K/Na ratio was 0.77.

Organoleptic properties of the cheese were evaluated by a sensory panel. Havarti type cheese with 29% fat and 1.3% NaCl (0.5% Na) was used as a reference cheese. No significant difference in triangle test (p=0.1495) was observed. The cheese of the invention was described little saltier and stronger than reference.

Example 5

Havarti type cheese having a fat content of 29% was prepared in a conventional manner from standardized milk by using typical starters and coagulants for havarti cheese. Salting of the pressed and moulded cheese block was carried out as follows: Cheese block was immersed into a brine solution (18% NaCl) for 4 hours. Subsequently, 2% of a RO retentate (16%) based on weight of cheese was added on top of cheese before packaging.

K content of the salted cheese was 0.34% based on weight of cheese. Na content of the salted cheese was 0.32% based on weight of cheese. Thus, total amount of Na+K was 0.66% and K/Na ratio was 1.05.

Significant difference in triangle test (p=0.0040) was observed. Sensory panel described the cheese stronger in taste and softer than the reference.

Example 6

Havarti type cheese having a fat content of 29% was prepared in a conventional manner from standardized milk by using typical starters and coagulants for havarti cheese. Salting of the pressed and moulded cheese block in a vat was carried out as follows: Cheese block was first immersed into a RO retentate (16%) for 1 hour. Subsequently, the cheese block was subjected to brine salting with NaCl (18%) for 4 hours. After brine salting, the cheese block was immersed into the RO retentate (16%) for further 1 hour.

K content of the salted cheese was 0.19% based on weight of cheese. Na content of the salted cheese was 0.2% based on weight of cheese. Thus, total amount of Na+K was 0.39% and K/Na ratio was 0.95.

Sensory panel described the cheese similar to the reference in taste and firmer in structure.

Example 7

Edam type cheese having a fat content of 9% was prepared in a conventional manner from standardized milk by using typical starters and coagulants for Edam cheese. Salting of the pressed and moulded cheese block in a vat was carried out as follows: Cheese block was first subjected to brine salting with NaCl (18%) for 6 hours. Subsequently, the cheese block was immersed into a RO retentate (16%) for 2 hours.

K content of the salted cheese was 0.24% based on weight of cheese. Na content of the salted cheese was 0.24% based on weight of cheese. Thus, total amount of Na+K was 0.48% and K/Na ratio was 1.0.

Example 8

Cottage cheese type cheese having a fat content of 2% and 0.2% were prepared in a conventional manner from standardized milk by using typical starters and coagulants for Cottage cheese.

Skimmed milk was pasteurized and cooled, and then coagulated with a mesophilic starter with a small amount of rennet. After coagulation (pH about 4.4-4.9) the coagulum was cutted to form a whey-curd mixture. The mixture was scalded at a temperature of 45 to 55° C. under stirring for 60 to 120 minutes. Whey was separated from the loose whey cheese grain mixture. The mixture was cooled, washed, standardized (fat, salt) with a dressing, and packed.

Cottage cheese (2% fat): Dressing to the cottage cheese grains contained pasteurized skimmed milk, pasteurized cream, potassium sorbate, and a salting mixture of NaCl and RO retentate (milk mineral salt) (1:1). K content of the cottage cheese was 0.18% based on the weight of cheese (with dressing). Na content of the cottage cheese was 0.20% based on the weight of cheese (with dressing). K/Na ratio was 0.9.

Cottage cheese (0.2% fat): Dressing to the cottage cheese grains contained pasteurized skimmed milk, potassium sorbate and a salting mixture of NaCl and RO retentate (milk mineral salt) (1:20). K content of the cottage cheese was 0.32% based on the weight of cheese (with dressing). Na content of the cottage cheese was 0.10% based on the weight of cheese (with dressing). K/Na ratio was 3.2.

Example 9

Mozzarella type cheese having a fat content of 20% was prepared in a conventional manner from standardized milk by using typical starters and coagulants for Mozzarella cheese. Two batches of Mozzarella cheese were prepared using different salting agents.

Cheese curd was made with a rennet and a Mozzarella starter. Whey was separated from the cheese curd, the curd was pressed, a salting mixture of NaCl and RO retentate (milk mineral salt) (1:1) was added, and the mixture was cheddared until pH 5.2-5.6 was achieved. Cheese was then milled to small pieces, heated and kneaded in whey at about 70° C. to a smooth plastic mass. The mass was moulded and cooled to provide Mozzarella. K content of the cheese was 0.14% based on the weight of cheese. Na content of the cottage cheese was 0.27% based on the weight of cheese. K/Na ratio was 0.52.

Cheese curd was made with a rennet and a Mozzarella starter. Whey was separated from the cheese curd, the curd was pressed, a salting mixture of NaCl and RO retentate (milk mineral salt) (1:10) was added, and the mixture was cheddared until a suitable pH (5.2-5.6) was achieved. Cheese was then milled to small pieces, heated and kneaded in whey at about 70° C. to a smooth plastic mass. The mass was moulded and cooled to provide Mozzarella. K content of the cottage cheese was 0.24% based on the weight of cheese. Na content of the cottage cheese was 0.13% based on the weight of cheese (with dressing). K/Na ratio was 1.8.

It will be obvious to a person skilled in the art that, as the technology advances, the inventive concept can be implemented in various ways. The invention and its embodiments are not limited to the examples described above but may vary within the scope of the claims.

The invention claimed is:

1. A method of making a soft or semi-soft cheese having a ratio of K/Na of from 0.2 to 4.0, the method comprising the steps of:
    coagulating milk to provide a whey-curd mixture;
    removing whey from the whey-curd mixture to provide cheese curd; and
    adding a salting mixture of milk minerals and NaCl to the cheese curd to make soft or semi-soft cheese having a water content of a fat-free part (MFFB) of the cheese of 61% to 69%, wherein the mixture of milk minerals comprises, as a percentage of dry matter: lactose 2.4 to 50%, sodium 3.5 to 12%, potassium 0.5 to 35%, magnesium 0.1 to 1.5%, calcium 0.1 to 25%, and protein 8 to 20%,
    wherein the method does not comprise a step of brine salting.

2. The method of claim 1 wherein the ratio of K/Na from 0.8 to 4.0.

3. The method of claim 1 wherein the ratio of K/Na is from 0.52 to 3.2.

4. The method of claim 1 wherein the K content of the cheese is more than 0.08%.

5. The method of claim 1 wherein the K content of the cheese is more than 0.2%.

6. The method of claim 1 wherein the K content of the cheese is from 0.14% to 0.32%.

7. The method of claim 1, wherein the soft and semi-soft cheese is unripened.

8. The method of claim 1, wherein the water content of the fat-free part (MFFB) of the cheese is 67% to 69%.

9. The method of claim 1, wherein the NaCl content of the cheese is in the range of 0.25% to 0.67%.

10. The method of claim 1 wherein the milk minerals are provided as a milk mineral concentrate obtained by a process wherein
    milk is subjected to ultrafiltration to provide an ultrafiltration permeate,
    the ultrafiltration permeate is subjected to nanofiltration to provide a nanofiltration permeate,
    the nanofiltration permeate is subjected to reverse osmosis to provide a reverse osmosis retentate as the milk mineral concentrate.

11. The method of claim 10 wherein a dry matter content of the milk mineral concentrate is about 9% to about 40%.

12. The method of claim 10 wherein a dry matter content of the milk mineral concentrate is about 16%.

13. The method of claim 1 wherein a concentration of NaCl is in a range of about 16% to a saturated concentration of NaCl.

14. The method of claim 1 wherein a concentration of NaCl is about 18%.

15. The method of claim 1, wherein a ratio of milk minerals and NaCl in the salting mixture is 1:1.

16. The method of claim 1, wherein a ratio of milk minerals and NaCl in the salting mixture is in the range of 1:0.4 to 1:3.3 on dry matter basis.

17. The method of claim 1, wherein a ratio of milk minerals and NaCl in the salting mixture is 1:1.1 on dry matter basis.

18. Soft or semi-soft cheese comprising: milk minerals comprising, as a percentage of dry matter: lactose 2.4 to 50%, sodium 3.5 to 12%, potassium 0.5 to 35%, magnesium 0.1 to 1.5%, calcium 0.1 to 25%, and protein 8 to 20%; and having a ratio of K/Na of from 0.2 to 4.0, wherein a water content of a fat-free part (MFFB) of the cheese is 61% to 69%.

19. Soft or semi-soft cheese of claim 18 wherein the ratio of K/Na from 0.8 to 4.0.

20. Soft or semi-soft cheese of claim 18 wherein the ratio of K/Na is from 0.52 to 3.2.

21. Soft or semi-soft cheese of claim 18 wherein the K content of the cheese is more than 0.08%.

22. Soft or semi-soft cheese of claim 18 wherein the K content of the cheese is more than 0.2%.

23. Soft or semi-soft cheese of claim 18 wherein the K content of the cheese is 0.14% to 0.32%.

24. Soft or semi-soft cheese of claim 18, wherein the soft and semi-soft cheese is unripened.

25. Soft or semi-soft cheese of claim 18, wherein the water content of the fat-free part (MFFB) of the cheese is 67% to 69%.

26. Soft or semi-soft cheese of claim 18, wherein the NaCl content of the cheese is in the range of 0.25% to 0.67%.

* * * * *